(12) United States Patent
Sahinoja et al.

(10) Patent No.: US 7,590,629 B2
(45) Date of Patent: Sep. 15, 2009

(54) METHOD AND NETWORK DEVICE FOR SYNCHRONIZATION OF DATABASE DATA ROUTED THROUGH A ROUTER

(75) Inventors: Mikko Sahinoja, Tampere (FI); Jussi Piispanen, Tampere (FI); Jouni Rapakko, Kylmäkoski (FI); Mika Martikainen, Lempäälä (FI)

(73) Assignee: Nokia Corporation, Espoo (FI)

( * ) Notice: Subject to any disclaimer, the term of this patent is extended or adjusted under 35 U.S.C. 154(b) by 606 days.

(21) Appl. No.: 10/410,881

(22) Filed: Apr. 9, 2003

(65) Prior Publication Data

US 2004/0006551 A1 Jan. 8, 2004

(30) Foreign Application Priority Data

Apr. 17, 2002 (WO) .................. PCT/IB02/01236

(51) Int. Cl.
*G06F 7/00* (2006.01)
*G06F 17/30* (2006.01)

(52) U.S. Cl. .............. 707/10; 709/238; 709/228; 709/224; 709/201; 709/206; 707/200

(58) Field of Classification Search ............ 707/3, 707/10, 200; 709/224, 228, 200, 206, 248, 709/201, 250, 238; 455/466
See application file for complete search history.

(56) References Cited

U.S. PATENT DOCUMENTS

| | | | |
|---|---|---|---|
| 5,918,020 A * | 6/1999 | Blackard et al. ............ 709/228 |
| 5,926,816 A | 7/1999 | Bauer et al. |
| 5,970,502 A | 10/1999 | Salkewicz et al. |
| 6,052,812 A * | 4/2000 | Chen et al. ................. 714/751 |
| 6,331,984 B1 | 12/2001 | Luciani |
| 6,356,951 B1 * | 3/2002 | Gentry, Jr. ................. 709/250 |
| 6,427,169 B1 * | 7/2002 | Elzur ........................ 709/224 |
| 6,885,680 B1 * | 4/2005 | Kovacevic et al. .......... 370/503 |
| 6,925,481 B2 * | 8/2005 | Singhal et al. .............. 709/200 |
| 2002/0010736 A1 * | 1/2002 | Marques et al. ............. 709/201 |
| 2002/0120696 A1 * | 8/2002 | Mousseau et al. ........... 709/206 |
| 2002/0176404 A1 * | 11/2002 | Girard ........................ 370/352 |
| 2003/0004937 A1 * | 1/2003 | Salmenkaita et al. ........... 707/3 |
| 2003/0045311 A1 * | 3/2003 | Larikka et al. .............. 455/466 |

FOREIGN PATENT DOCUMENTS

| | | |
|---|---|---|
| EP | 0926922 | 6/1999 |
| EP | 1089498 | 4/2001 |
| WO | 0033217 | 6/2000 |
| WO | 0062201 | 10/2000 |

\* cited by examiner

*Primary Examiner*—Jean M Corrielus
*Assistant Examiner*—Giovanna Colan
(74) *Attorney, Agent, or Firm*—Ware, Fressola, Van Der Sluys & Adolphson LLP (57) ABSTRACT

SyncML is used for synchronizing data of terminal device in wireless and wired environments. In general, synchronization takes place between a terminal device (e.g., a mobile phone) and a server device (e.g., a web server in Internet). However, a SyncML session, which occurs between the terminal and server, is an end-to-end communication. The idea of the present invention is to provide a method, a router and a system to allow routing of the synchronizing data exchanged during a synchronizing session through such a router. In general having the router is more cost efficient and a faster solution from the end-user point of view.

18 Claims, 4 Drawing Sheets

METHOD AND NETWORK DEVICE FOR SYNCHRONIZATION OF DATABASE DATA ROUTED THROUGH A ROUTER

CROSS-REFERENCE TO RELATED APPLICATION

The present application claims priority under 35 USC 119 to PCT/IB02/01236 filed Apr. 17, 2002.

BACKGROUND OF THE INVENTION

1. Technical Field

The invention relates to synchronization or updating of database data between two devices in a communication system and particularly between two devices and an interposed intermediate routing device. Data synchronization is a function where at least two data collections are made similar to each other so that the data units of the data collections substantially correspond to each other after synchronization. The intermediate network device provides for an adequate connection between the devices and forwards the exchanged data to the devices.

2. Discussion of Related Art

Data of portable terminals, such as portable computers, PDA terminals (personal digital assistant), mobile stations or pagers, can be synchronized with network applications, applications of desktop computers or with other databases of the telecommunications system. In particular, data of calendar, contact card applications and e-mail applications are typically synchronized, wherein the data to be synchronized includes, e.g., calendar events, contact cards and various types of messages like e-mails, short messages in accordance with the short message service (SMS), multimedia messages in accordance with the multimedia message service (MMS), etc. But also non-ordinary devices will offer synchronization capability. Such a non-ordinary device may be a digital camera able to synchronize pictures with a central picture managing server providing an easy to use upload method to the user of such a digital camera.

Synchronization has been based on the use of different manufacturer-specific protocols which are incompatible. This restricts the use of terminals or data types and often causes difficulty to the user. In mobile communication, in particular, it is important that data can be retrieved and updated regardless of the terminal and application used.

To improve synchronization of application data, a language known as synchronization markup language SyncML, which is based on the XML (extensible markup language), has been developed. By using a SyncML synchronization protocol, which employs messages in the SyncML format, data of any application or data for configuring of an application or a device function can be synchronized between participating devices of any kind. The SyncML synchronization protocol functions both in wireless and in fixed networks and supports several transmission protocols.

Up to now, the synchronization has been understood to be an end-to-end service, i.e. two devices communicate directly to each other using a logical connection. However, there may be several situations where a direct connection between these synchronizing devices (i.e. normally a user terminal client device and a dedicated synchronization server) is not available or not desirable since for example, the client device may be connected via a laptop or a personal computer over a local communication network such as a bluetooth network, an infrared connection or a wire-based connection to the server device, which may be connected, however, over a LAN (local area network) and/or a WAN (wide area network) to the client device. In such a situation, the synchronization session may be initiated, controlled and routed by the intermediate network device offering commonly cheaper and faster communication.

Further, the routing of the synchronization is also advantageous for an end-user having no access points stored in the terminal device, or does not even need no data transfer capability over the air in the terminal device. An end-user only using synchronization may not even have to have a data transfer subscription only for this purpose. Additionally, there may be a different network technology, which prevents a direct connection (e.g. a GSM 900 terminal in a code division multiple access (CDMA) network), and thus a router is needed for performing a synchronization.

Currently, it is not possible to route a synchronization session over an intermediate network device and therefore it is even not possible to initiate such a routed synchronization session by an intermediate network device. It would, however, be advantageous for a user to start a synchronization from an interposed network device which is actually not a part of the synchronization transaction itself.

DISCLOSURE OF INVENTION

An object of the invention is to provide a method for synchronizing data between two devices routed through an intermediate network device. Further, an object of the invention is to provide the corresponding intermediate network device able to route the synchronizing data and a system for synchronizing data between two devices routed through an intermediate network device.

The objects of the invention are attained by a method, an intermediate network device, a synchronization system and a computer program which are characterized by what is disclosed in detail below.

According to an embodiment of the invention, a method for synchronizing data between a first device and a second device is provided. The synchronization data may be part of a database to be synchronized. The term "database" is to be understood broadly as referring to a data collection of any data source or data storage that can be updated by one or more applications. The synchronization data are related to, e.g., personal data such as calendar events, contact cards and various types of messages like e-mails, short messages. Alternatively, the synchronization data are related to configuration data for configuring the receiving device, an application of the receiving device and/or controlling the operation of the receiving device and/or an application of the receiving device. The term configuration data comprises preference data, parameters and settings dedicated therefor.

The synchronization data is routed through an intermediate network device via an established communication connection. The synchronization data are arranged for transmission via communication connections on the top of transfer protocols in accordance to the kind of employed communication connections, such as hyper text transfer protocol (HTTP) of the transport control protocol/internet protocol (TCP/IP) stack, wireless session protocol (WSP) of the wireless application protocol (WAP) standard. The synchronization data wrapped by such a transfer protocol wherein the synchronization data itself are provided in accordance to a synchronization transfer protocol.

In a first operation, data arranged for transmission, i.e. a synchronization message, containing synchronization related information, is received from the first device preferably by said intermediate network device. In a following operation the synchronization related information of the data is processed by the intermediate network device. Finally, at least a part of the data containing the processed synchronization related information is transmitted to the second device by the intermediate network device.

In order to provide a routing of the synchronization data between the participating devices according to this embodiment of the invention, the processing of the synchronization related information comprises additionally an extracting of the synchronization related information form the data arranged for transmission, since at least address information comprised by the synchronization related information will have to be processed. Therefore, the synchronization related information is parsed and interpreted for routing information, respectively. The corresponding identified routing information are processed in order to obtain processed synchronization related information. The processing of the routing information may be for example a modifying or a replacing of address information relating to the participating synchronizing devices and the intermediate network device. Finally, the processed synchronization related information are arranged to data for transmission which is based on the transfer protocols available of the communication connection to the receiving synchronizing device.

It should be noted that the data arranged for transmission can be routed in accordance to the transport level routing of state of the art. This kind of routing of data through communication networks is out of the scope of the present invention. The concept of the present invention relates to the routing of the synchronization related information which is contained by this data arranged for transmission. This kind of routing may be termed as synchronization level routing and completes the routing of synchronization data.

According to an embodiment of the invention, the arranging of the data for transmission According to an embodiment of the invention, the connection is established by an initiation from the first or the second device. The first device or the second device may be instructed to set up the connection to the corresponding counterpart, wherein the communication connection is set up such that exchanged data packets transmitted via this communication connection are routed through the intermediate network device.

According to an embodiment of the invention, an initial data packet is transmitted from said intermediate network device to either the first device or the second device. The initial data packet, i.e. an initial synchronization message, may contain instructions due to the initialization of the connection between both devices routed through the intermediate network device.

According to an embodiment of the invention, the parsing and/or interpreting of the synchronization related information comprises caching of address information relating to the synchronization participating devices.

According to an embodiment of the invention, the parsing and/or interpreting of the synchronization related information comprises logging of status information related to the synchronization related information in order to log status information of the synchronization process and, for example its progress.

According to an embodiment of the invention, the logging of status information comprises transmitting the logged status information to the intermediate network device.

According to an embodiment of the invention, the processing of the routing information comprises including a response address information. The response address information may designate the intermediate network device in order to enable the second device receiving the data packet to transmit a subsequent data packet to the intermediate network device.

According to an embodiment of the invention, the processing of the routing information comprises processing of address information. The routing information may address the intermediate network device and may have to be replaced by address information addressing the receiving second device. The corresponding address information may be cached to be retrieved therefor.

According to an embodiment of the invention, the processing of the routing information comprises modifying a data packet identification number.

According to an embodiment of the invention, the processing of the routing information comprises removing a part of said synchronization related information.

According to an embodiment of the invention, the communication connection is a logical connection in accordance with a hypertext transfer protocol (HTTP). Further the communication connection is a logical connection in accordance with an object exchange protocol (OBEX), wireless session protocol (WSP) or the like.

According to an embodiment of the invention, the synchronization is based on a synchronization protocol in accordance with the synchronization markup language (SyncML) standard, for example for synchronization or device management.

According to an embodiment of the invention, a software tool for synchronization data between a first device and a second device routed through an intermediate network device is provided. The software tool comprises program portions for carrying out the operations of the aforementioned methods when the software tool is implemented in a computer program and/or executed.

According to an embodiment of the invention, there is provided a computer program for synchronization of data between a first device and a second device routed through an intermediate network device. The computer program comprises program code portions for carrying out the operations of the aforementioned methods when the program is executed on a processing device a computer or a network device.

According to an embodiment of the invention, a computer program product is provided which comprises program code portions stored on a computer readable medium for carrying out the aforementioned methods when said program product is executed on a processing device, a computer or network device.

According to an embodiment of the invention, there is provided an network device for synchronization of data between a first device and a second device. The intermediate network device is adapted to operate the aforementioned method according to an embodiment of the present invention. The intermediate network device comprises at least a communication interface and a routing agent. The communication interface is able to receive data arranged for transmission from the first device and to transmit the data to the second device. The data contains synchronization related information. The routing agent is adapted to and is able to extract and parse the synchronization related information, to process the synchronization related information in accordance to the parsing before the modified data containing the processed synchronization related information is obtained and transmitted to the second device.

According to an embodiment of the invention, a system for synchronization of data between a first device and a second device routed through an intermediate network device is provided. The first device and the second device are adapted to perform the synchronization. Preferably, the synchronization may be operated in accordance with the synchronization markup language (SyncML) standard. The intermediate network device is adapted to operate the aforementioned method according to an embodiment of the present invention. Conveniently, the intermediate network device is be adapted to and is able to receive a data arranged for transmission from the first device, to extract and parse the synchronization related information contained in the data, to process the synchronization related information in accordance with the parsing and finally, to obtain and transmit the modified data containing the processed synchronization related information to the second device. The communication process is operated analogously in case of receiving a data packet from the second device and forwarding the processed data packet to the first device.

The invention will be described in greater detail by the means of preferred embodiments with reference to the accompanying drawings, in which

BEST MODE FOR CARRYING OUT THE INVENTION

In the following, the preferred embodiments of the invention will be described in a system supporting SyncML standard without limiting the invention thereto. Same or equal parts shown in the figures will be referred by the same reference numerals.

Figure 1:
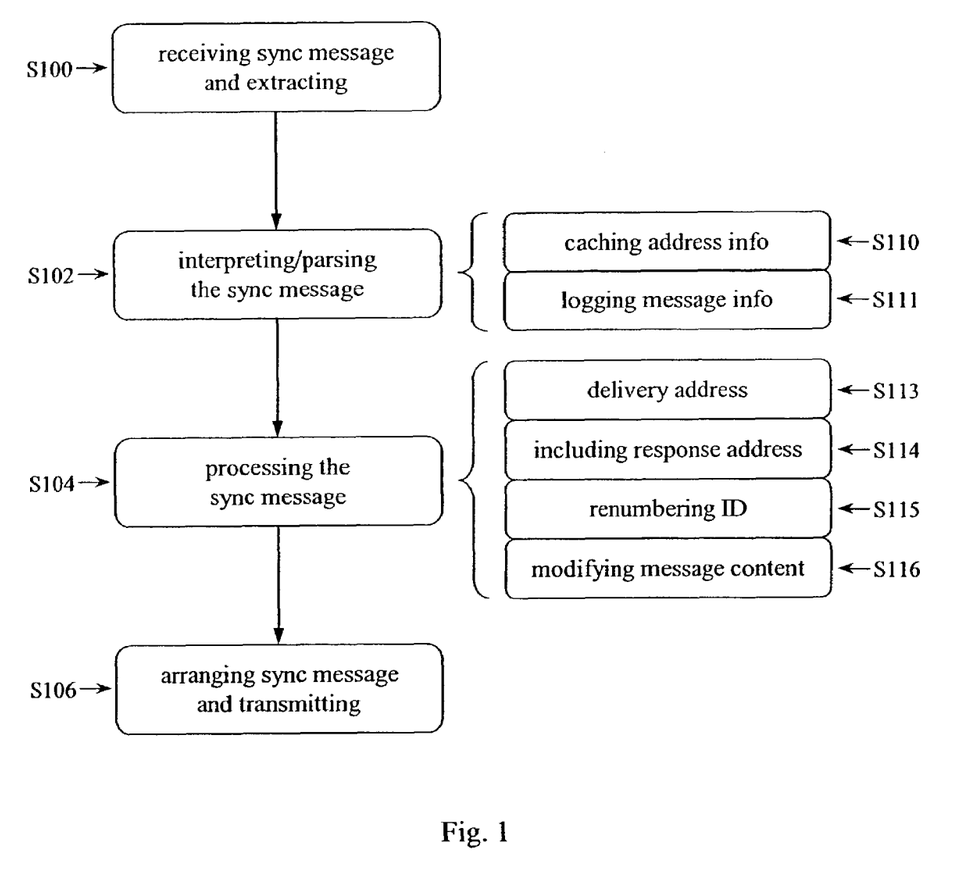
FIG. 1 shows a flow diagram illustrating the sequences of operations of a method according to an embodiment of the invention.

FIG. 1 shows a flow diagram illustrating a sequence of operations of a method operated by an intermediate network device, i.e. a routing device, according to an embodiment of the invention. The sequence of operations will be described with respect to a sequence of subsequent operations wherein the sequence should be understood as exemplary and not limiting.

It shall be understood that the following operations are operated each time an intermediate network device, i.e. a routing device, receives data packets related to a synchronization session from either a first device or a second device. The data packets may be termed in the following as synchronization messages. These synchronization messages may be parts of the complete synchronization information exchanged during the synchronization session between the first device and the second device, i.e. for example in the nomenclature of the synchronization markup language (SyncML) a client device and a server device or vice versa, respectively.

The SyncML synchronization protocol is implemented between the client device, and the server device on the top of a transfer protocol, e.g., on top of the hyper text transfer protocol (HTTP), the wireless session protocol (WSP) of the wireless application protocol (WAP) standard, the object exchange protocol (OBEX), the transport control protocol/internet protocol (TCP/IP) stack and on top of the transport layer service offered by the e-mail protocol (e.g. simple mail transfer protocol, SMTP).

In an operation S100, the intermediate network device receives a synchronization message. The synchronization message is addressed to the intermediate network device to ensure the routing of the synchronization message thereof. The synchronization related information is extracted for the received synchronization message or the synchronization related information is extracted from the payload of the employed transfer protocol to be parsed and processed.

In an operation S102, the synchronization related information is parsed or interpreted by the intermediate network device, respectively. The synchronization related information is parsed for routing related information, particularly for address information but also message identification information and the like. Therefore, the synchronization related information may be decoded in order to parse the content of the synchronization message. Conventionally, the synchronization related information is composed of a message header and a message body.

In order to introduce the following operations, it may be noted that each synchronization message contains address information about the transmitting device and the receiving device in order to enable a communication of the synchronization messages, in order to identify the participating devices to each other and/or in order to identify the involved and/or requested services. This address information may have to be at least contained in the message header. Since the synchronization protocol is designed as an end-to-end protocol, the addressing information designates the receiving device. According to the concept of the present invention, the receiving device is the intermediate network device which routes the synchronization messages between the respective synchronizing devices. The intermediate network device may have to ensure that correct address information is comprised in the synchronization messages.

In an operation S110, the parsing and/or interpreting of the received synchronization related information may comprise extracting address information. The address information may relate to the coded address information of the transmitting device. This address information may be cached by the intermediate network device in order to be retrievable in case of a following synchronization message transmitted by the receiving device dedicated by the current interpreted and/or parsed synchronization message.

In an operation S111, the parsing and/or interpreting of the received synchronization message may enable the intermediate network device to maintain a current synchronization state by keeping a log of the synchronization information and instructions contained in the synchronization message. For example, the so obtained log may be displayed to a user to control and follow the synchronization session step by step in accordance with the exchanged synchronization messages or to reconstruct an indication of the proceeding of a performed synchronization session. The displaying of the obtained protocol log to a user on for example a display of a notebook or personal computer acting as intermediate network device is normally advantageous since these displays are commonly larger providing a better overview to a user in comparison to a display of a terminal device acting as synchronization client.

In an operation S104, the synchronization related information is processed, preferably the information for which the synchronization related information has been parsed is processed. The processing of the synchronization related information is a processing of information covered by the message header and/or by the message body. Further, the processing operation may be a modifying operation, a replacing operation, a removing operation or the like. The processing may even comprise a storing and/or retrieving of information which may be cached by the intermediate network device preferably during the synchronization session.

The following operations S113 to S116 are operations which may be further comprised by the processing of the synchronization message. These operations S113 to S116 are presented individually in order to structure in a more comprehensive form, but the presented division of the operation S104 is not to be understood as limited thereto.

In the operation S113, the address information contained in the synchronization related information are processed. The address information contained in the synchronization message designates the intermediate network device. This address information has to be replaced with the address information of the originally dedicated recipient of the synchronization message. The address information of the originally dedicated recipient may be retrieved and included into the synchronization message. The corresponding address information of the originally dedicated recipient may have been cached according to operation S110 described in detail above.

In the operation S114, a response address information is included in the synchronization related information, preferably, into the message header. This response address information instructs the receiving device of the processed synchronization message to transmit a following synchronization message to the recipient addressed by the response address information instead of transmitting it immediately to the counterpart device of the synchronization session which is the sender of the original synchronization message according to the SyncML standard. Therefore, the response address information designates the intermediate network device. The response address may be coded as an uniform resource identifier (URI) in the RespURI element in accordance with the synchronization markup language (SyncML) standard.

The following operations S115 and S116 may be necessary in case of an initiating of the synchronization session by the intermediate network device. Currently, according to the state-of the-art technology, only the synchronizing devices, herein the first device and the second device, are allowed to initiate a synchronization session.

In the operation S115, the message number may be processed. Each synchronization message may contain an identification number (MsgID) starting with one and increased by one at each time a new synchronization message related to the current synchronization session is generated. Assuming that the intermediate network device initiated the synchronization session, this message identification number (MsgID) does not have to be processed in order to meet the message identification number expected by the dedicated synchronization device.

It should be noted that an initial synchronization alert message which is initiated and transmitted by the intermediate network device to a client device contains an identification number (MsgID) which is one less than the identification number sent in the first synchronization message by the server (initialization message from the server). Since the identification number is increased by one with each synchronization message of a synchronization session the following synchronization message which is forwarded to the server device contains the identification number (MsgID) which is expected by the server device and the numbering not to have been adapted by the intermediate network device during the forwarding of the synchronization messages to the server device or the client device, respectively. Another alternative is that the intermediate network device modifies the message identification numbers (MsgID) sent by the server device throughout the session.

In the operation S116, the message contains status information. Again assuming that the intermediate network device initiated the synchronization session, this initiation may cause related information, e.g. status information, to be comprised in the following synchronization message. This information may not be expected by the dedicated synchronization recipient so that the information have to be removed from the synchronization message.

In an operation S106, the resulting processed synchronization message is forwarded by the intermediate network device to the dedicated synchronizing recipient.

The concept according to the present invention allows to set up an intermediate network device which is completely transparent to the synchronizing devices. For this, the intermediate network device may appear to both the synchronizing devices as the corresponding synchronizing counterpart device.

Figure 2:
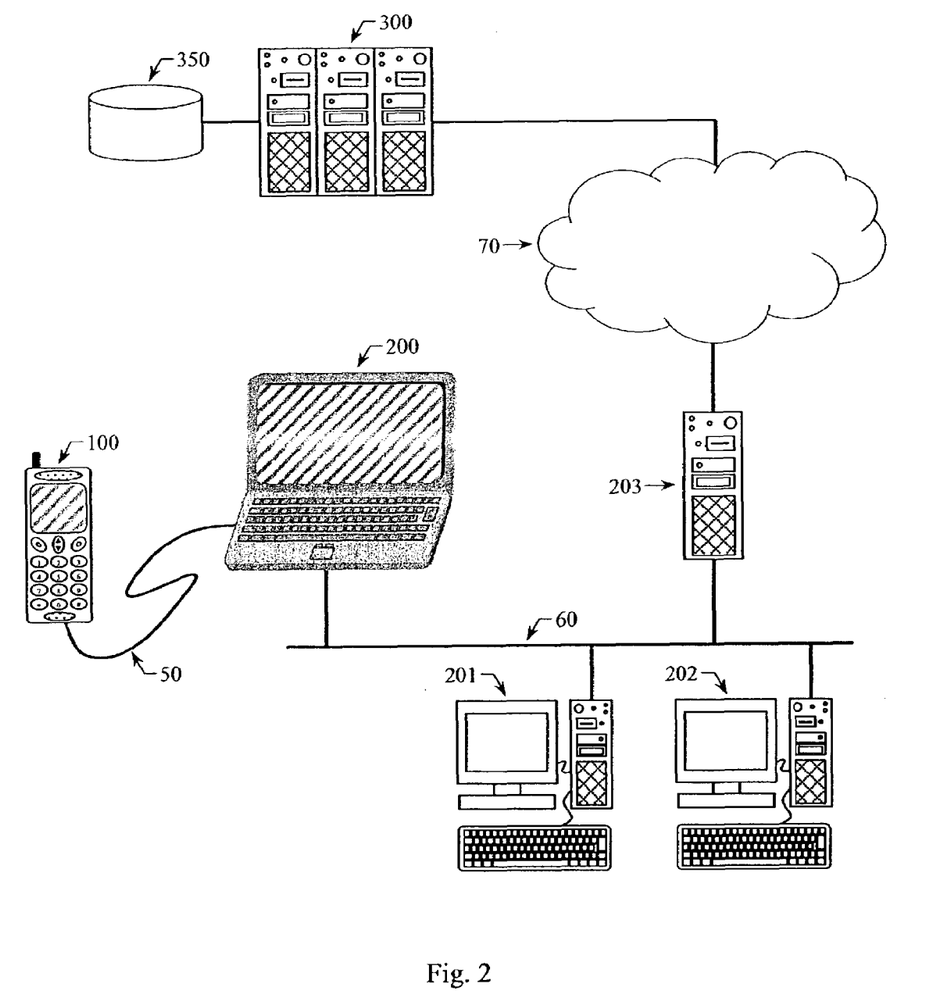
FIG. 2 shows a block diagram illustrating a typical system comprising a client, an intermediate network device and a server according to an embodiment of the invention.
Figure 3:
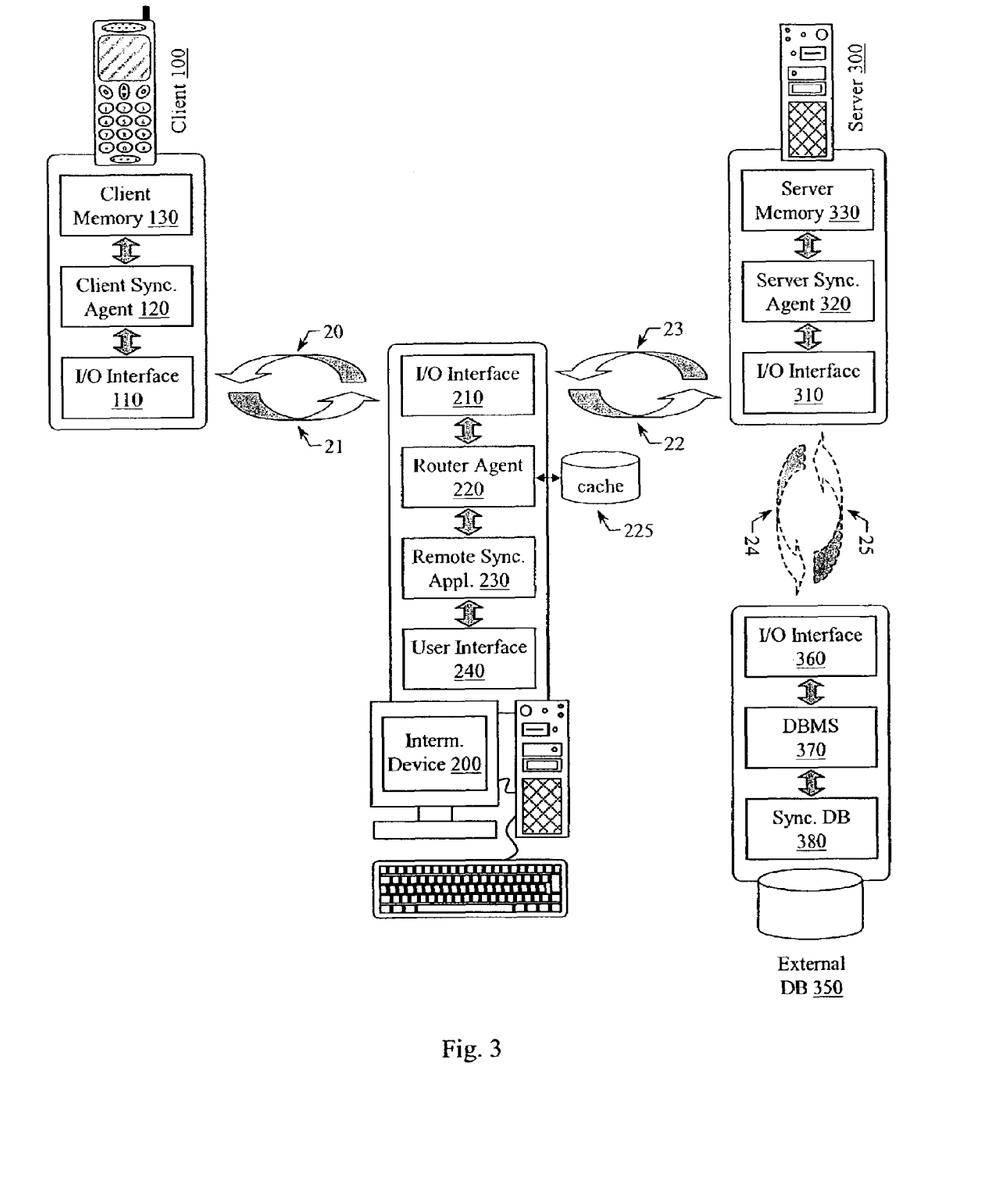
FIG. 3 shows a further block diagram illustrating a typical system comprising a client, an intermediate network device and a server as also components of these devices according to an embodiment of the invention

FIG. 2 shows a block diagram illustrating a typical real system according to an embodiment of the invention in order to describe the concept of the present invention. The following FIG. 3 shows a block diagram illustrating a system reduced to the essential devices comprising essential components.

The illustrated system comprises a first synchronizing device such as a mobile phone 100, an intermediate network device such as a notebook computer 200 and a second synchronizing device such as a dedicated synchronizing server or a server system 300 having access to a synchronization database 350. The mobile phone 100 acts as a client device which is the counterpart to the server 300 within the synchronization session. The notebook computer 200 acts as an intermediate network device or a routing device, respectively, connecting the mobile phone 100 to the server 300 by routing through the synchronization messages. The notebook computer 200 also acts as a controlling and monitoring device allowing a user to initiate a synchronization between mobile phone 100 and server 300 and allowing to monitor the status and the progress of a synchronization session.

The mobile phone 100 is connected to the notebook computer 200 via a dedicated local connection 50 whereas the notebook computer 200 is connected to the server 300 for example via a local area network (LAN) 60 and a wide area network (WAN) 70. The local area network (LAN) 60 and the wide area network (WAN) 70, e.g. the internet, may be interconnected via a dedicated routing device 203 which may additionally offer firewall functionality. The local area network (LAN) 60 may also provide connectivity of a plurality of further network devices, herein illustrated by personal computers 201 and 202. The dedicated local connection 50 may be a wire-based connection or a wireless connection. A wire-based connection may be a proprietary wire-based connection or a wire-based connection in accordance with the universal serial bus (USB) standard or RS-232 serial interface standard. A wireless connection may be an infrared communication connection (IrDA) or a short range radio frequency connection like Bluetooth or wireless local area network (WLAN).

Often access to local and wide area networks (LAN or WAN, respectively) is established by using the service of a network service provider. Usually, network service providers provide access to local or wide area networks (LAN or WAN, respectively) via special dial-in servers. The dial-in servers enable data exchange between processing devices connecting via the above described communication connections to processing devices connected to the dial-in server usually via a local or wide area network (LAN or WAN). Network service providers are usually used to access the internet. Corresponding services may be also provided by companies allowing their employee to access the company's own local area network (LAN) or wide area network (WAN). These dial-in servers can be connected using various communication links like wireless links, analog and digital telephone lines. Correspondingly, the notebook computer 200 may be connected to the server 300 via a dedicated telephone line and a dial-in server.

Additionally, the notebook computer 200 may also be connected to the server 300 via a dedicated connection like a wire-based connection or a wireless connection. Further, the connection to the server 300 may also include a wireless application protocol (WAP) gateway which for example may establish a communication connection by converting and/or adapting transfer protocols to wireless application protocol (WAP) or vice versa, respectively.

As aforementioned, the SyncML synchronization protocol can be implemented between the mobile phone 100, i.e. the client device, and the server 300, e.g., on top of the hyper text transfer protocol (HTTP), the wireless session protocol (WSP) of the wireless application protocol (WAP) standard, the object exchange protocol (OBEX) used for cable connections, such as universal serial bus (USB) or RS-232, for short-range radio frequency connections (Bluetooth) or for infrared connections (IrDA), the transport control protocol/internet protocol (TCP/IP) stack and on top of the transport layer service offered by the e-mail protocol (e.g. simple mail transfer protocol, SMTP).

Transfer at the lower layer can be performed according to the underlying network using e.g. short messages in accordance with the short message service (SMS) standard, multimedia messages in accordance with the multimedia message service (MMS) standard, messages in accordance with the session initialization protocol (SIP) standard and messages in accordance with likely standards. Further other signaling type transmission methods (e.g. USSD; unstructured supplementary service data), circuit-switched data calls or packet-switched data transfer services. These communication connection may primarily be employed by synchronizing via a direct communication connection between mobile phone 100, i.e. the client device, and the server 300.

It shall be noted that the further network devices 201 and 202 and the routing device 203 are out of the scope of the concept of the present invention and hence are only illustrated in order to present a realistic system in which the concept of the present invention may be implemented and further will not be described in detail.

Further it shall be noted that the illustrated notebook computer 200 acting as an intermediate network device for routing synchronization messages between the mobile phone 100 and the server 300 is chosen as an example. The notebook computer 200 shall represent a processing device able to operate the aforementioned method according to an embodiment of the invention. Preferably, the intermediate network device may be a processing device able to execute a software program which comprises instructions or program code portions for carrying out the operations of the aforementioned method according to an embodiment of the invention.

Further it shall be noted that the illustrated mobile phone 100 acting as a synchronizing device is chosen as an example. A broad variety of devices may offer the ability of synchronization and therefore may have implemented synchronization functionality in accordance with the synchronization markup language (SyncML) standard. Such a synchronizing device may be for example a mobile phone, a smart phone, a personal digital assistant (PDA), a mobile station, a pager or a mobile terminal.

Alternatively to the illustrated system of mobile phone 100 and notebook computer 200 the system synchronizing device and intermediate routing device may be also represented by a headset or video glasses acting as the synchronizing device and a mobile terminal to which the headset or the video glasses are connected and which may act as the intermediate routing device. Further, a system of wrist-watch user interface, smart clothes acting as synchronizing device in combination with a mobile phone or any kind of central unit acting as intermediate routing device. Another exemplary distributed device system may be a WEB/WAP pad acting as synchronizing device in combination with a central unit which may offer processing and network access capability and therefore acts the intermediate routing device.

Further it shall be noted that the illustrated server 300 acting as a synchronizing device is chosen as an example. A broad variety of devices may offer the ability of a synchronization and therefore may have implemented synchronization functionality in accordance with the synchronization markup language (SyncML) standard. Such a synchronizing device may be for example a desktop computer such as a personal computer running the synchronization serving application or a dedicated synchronization server operated by an mobile telecommunication provider. Further, the server may be an informational server e.g. providing weather information or stock market information, a informational server providing location based information, such as city information, a server of a smart house providing house-related information (temperature, failure messages etc.) and the like.

FIG. 3 shows a further block diagram illustrating a typical system comprising a client, an intermediate network device and a server, and also components of these devices according to an embodiment of the invention.

The client device 100 comprises an I/O interface 110, a client synchronization agent 120 and a client memory 130. The I/O interface 110 provides the capability to communicate with further devices, particularly with the intermediate network device 200. The client sync agent 120 provides the synchronization capability, for example according to the synchronization markup language (SyncML) standard, for synchronizing data which may be stored within the client memory 130 with the synchronization counterpart, i.e. the server 300.

The I/O interface 110 may be constituted by a data processing device which may be comprised by the client 100. Further, the I/O interface 110 may be constituted by a code section for executing on client 100 containing instructions for carrying out the necessary processing operations. The client synchronization agent 120 may be constituted by a code section for executing on client 100 containing instructions for carrying out the necessary processing operations.

The intermediate network device 200, i.e. the routing device, comprises an I/O interface 210, a routing agent 220, a cache 225, a remote synchronization application 230 and a user interface 240. The I/O interface 210 provides the capability to communicate with further devices, particularly with the client 100 and the server 300. The routing agent 220 provides the routing capability and functionality in accordance with the aforementioned method according to an embodiment of the invention. The routing agent 220 may be able to access the cache 225 for storing and retrieving, providing the possibility to cache information obtained from the interpreted/parsed synchronization messages. The remote synchronization application 230 in combination with the user interface 240 may offer the possibility to a user to control and monitor a synchronization session routed through the intermediate network device 200. The controlling of the synchronization session may include an initiating of the synchronization session by a user. The monitoring may include a displaying of status information during a running synchronization session. The remote synchronization application 230 and the user interface 240 may be additional components that are not absolutely necessary for providing the routing capability according to the aforementioned method.

The I/O interface 210 may be constituted by a data processing device which may be included in the intermediate network device 200. Further, the I/O interface 210 may be constituted by a code section for executing on intermediate network device 200 and containing instructions for carrying out the necessary processing operations. The routing agent 220 may be constituted by a code section for execution on intermediate network device 200 and containing instructions for carrying out the necessary processing operations. Further the remote synchronization application 230 and the user interface may also be constituted by a code section for executing on intermediate network device 200 and containing instructions for carrying out the necessary processing operations. The remote synchronization application 230 and the routing agent 220 may preferably communicate via an application program interface (API) which may be based on a component object model (COM). Further, the remote synchronization application 230 and the user interface 240 may be implemented in a further processing device and may communicate via the I/O interface 210 with the intermediate network device.

The server 300 comprises an I/O interface 310, a server synchronization agent 320 and a server memory 330. The I/O interface 310 provides the capability to communicate with further devices, particularly with the intermediate network device 200. The server synchronization agent 320 provides the synchronization capability, for example according to the synchronization markup language (SyncML) standard, for synchronizing data included in databases which may be stored within the server memory 330 with the synchronization counterpart, i.e. the client 100.

The I/O interface 310 may be constituted by a data processing device which may be comprised by the server 300. Further, the I/O interface 310 may be constituted by a code section for executing on server 300 and containing instructions for carrying out the necessary processing operations. The server synchronization agent 320 may be constituted by a code section for executing on server 300 and containing instructions for carrying out the necessary processing operations.

Additionally, the synchronizing data may be provided by an external database (DB) 350. The external database 350 may comprise an I/O interface 360, a database management system (DBMS) 370 and synchronization databases 380. The server 300 may communicate with the external database 350 via the I/O interface 310 and the I/O interface 360, respectively. The synchronization data may be retrieved by the server synchronization agent 320 from the external database 350. The external database 350 may be a database of the state of the art and out of the scope of the present invention.

The respective communication connections are illustrated by the arrows 20, 21, 22 and 24 indicating the routing of the synchronization messages of a synchronization session through the intermediate network device 200. The additional communication connections between server 300 and external database 350 are illustrated by arrows 24 and 25. The communication connections illustrated by the arrows 20 and 21 may be analogous to the communication connection 50 described with reference to FIG. 2. The communication connections illustrated by the arrows 22 and 23 may be analogous to the communication connections 60 and 70 described with reference to FIG. 2.

Figure 4:
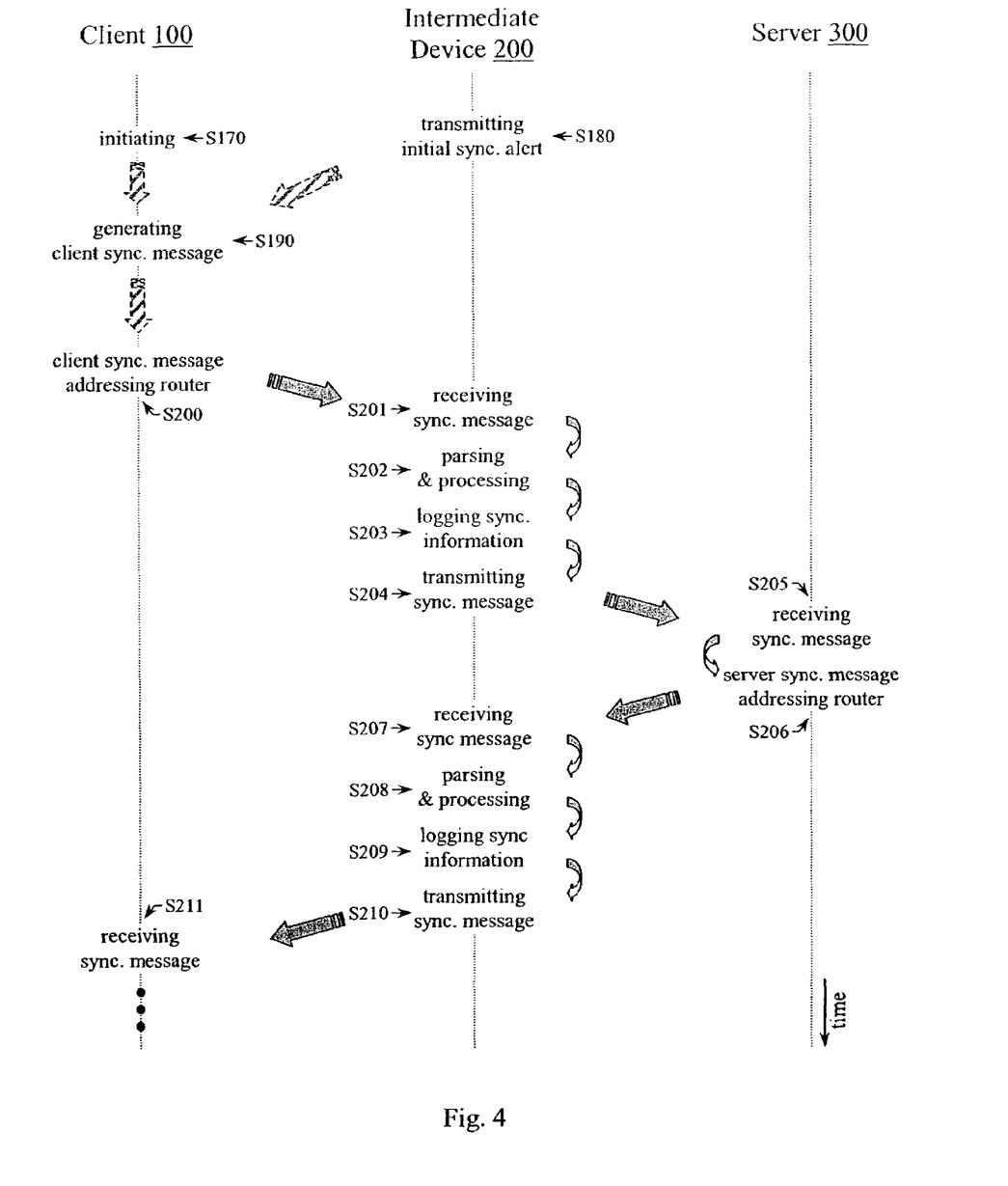
FIG. 4 shows a signaling chart illustrating signaling events and operations of the participating devices according to the block diagram of FIG. 3 and according to an embodiment of the invention.

The interaction of the different aforementioned devices and their implemented components is described below in combination with the flow chart shown in FIG. 4 illustrating a part of a synchronization session.

FIG. 4 shows a signaling chart illustrating signaling events and operations of the participating devices according to the block diagram of FIG. 3 and according to an embodiment of the invention. Additional reference will also be made to the above described FIG. 3 in order to complete the view of the intermediate network device operations described in FIG. 4. The participating devices which are within the scope of the invention and according to an embodiment of the invention may be a client 100, an intermediate network device 200 and a server 300, wherein these devices may comprise the components and may provide the capabilities and functionality described and shown in FIG. 3.

In an operation S200, the client 100 transmits a synchronization message. This synchronization message may be one of several synchronization messages which are usually communicated during a synchronization session. The synchronization message is addressed to the intermediate network device 200. The synchronization message may be transmitted via the communication connection 21 illustrated in FIG. 3 and via the communication connection 50 illustrated in FIG. 2, respectively.

The following operations S201 to S204 may be operated in accordance with the method according to an embodiment of the invention described operations S100 to S116 with reference to FIG. 1.

In an operation S201, the intermediate network device 200 receives the synchronization message transmitted by the client 100.

In an operation S202, the synchronization message is interpreted/parsed and processed. The address information concerning the recipient may have to be modified. The client 100 may have included address information of the intermediate network device 200 into the synchronization message such that the synchronization message is transmitted thereto. This address information may have to be replaced by the address information of the original recipient of the synchronization message which is preferably the server 300. Further the intermediate network device 200 may include a response address information into the synchronization message. The response address information addresses the intermediate network device itself and may ensure that a succeeding synchronization message generated by the server 300 is addressed and transmitted to the intermediate network device 200.

In an operation S203, information contained in the synchronization message may be extracted, cached and logged. Address information contained in the synchronization message concerning the recipient and the sender of the synchronization message may be cached in order to be retrieved for address replacement in accordance with the routing of the synchronization message. Status information may be logged in accordance with information obtained from the synchronization message. For example, the logged information may be status information indicating the progress of the synchronization session or may be information on the exchanged synchronization data. This logged information may be additionally communicated to an application displaying the logged information to a user or storing the logged information for a future evaluation. The application may be the remote synchronizing application 230 combined with the user interface 240 both illustrated in FIG. 3.

In an operation S204, the processed synchronization message is forwarded to the server 300. The synchronization message is addressed to the server 300. The synchronization message may be transmitted via the communication connection 22 illustrated in FIG. 3 and via the communication connections 60 and 70 illustrated in FIG. 2, respectively.

In an operation S205, the server 300 receives the synchronization message from the intermediate network device 200. A server synchronization agent, e.g. the server synchronization agent 320 illustrated in FIG. 3, may interpret/parse and process the synchronization message in accordance with the contained synchronization information and advantageously in accordance with the synchronization markup language (SyncML) standard.

In an operation S206, the server 300 generates a server synchronization message containing synchronization information for the client 100. The server 300 may take account of the response address information contained in the antecedent received synchronization message from the client 100. The response address information may address the intermediate network device 200. Accordingly, the synchronization message is addressed to the intermediate network device 200. The synchronization message may be transmitted via the communication connection 23 illustrated in FIG. 3 and via the communication connections 60 and 70 illustrated in FIG. 2, respectively.

Again, the following operations S207 to S210 may be operated in accordance with the method according to an embodiment of the invention described operations S100 to S116 with reference to FIG. 1. Conveniently, the following operations S207 to S210 may be operated analogous to the operations S201 to S204 described above with reference to FIG. 4.

In an operation S207, the intermediate network device 200 receives the synchronization message transmitted by the server 300.

In an operation S208, the synchronization message is interpreted/parsed and processed. The address information concerning the recipient may have to be modified. The server 300 may have included address information of the intermediate network device 200 into the synchronization message, taking the response address information of the antecedent synchronization message into account such that the synchronization message is transmitted thereto. This address information may have to be replaced by the address information of the original recipient of the synchronization message which is preferably the client 100. Further, the intermediate network device 200 may include a response address information into the synchronization message. The response address information addresses the intermediate network device itself and may ensure that a succeeding synchronization message generated by the client 100 is addressed and transmitted to the intermediate network device 200.

In an operation S209, information contained in the synchronization message may be extracted, cached and logged. Address information contained in the synchronization message concerning the recipient and the sender of the synchronization message may be cached in order to be retrieved for address replacement in accordance with the routing of the synchronization message. Status information may be logged in accordance with information obtained from the synchronization message. For example, the logged information may be status information indicating the progress of the synchronization session or may be information on the exchanged synchronization data.

This logged information may be additionally communicated to an application displaying the logged information to a user or storing the logged information for a future evaluation. The application may be the remote synchronizing application 230 combined with the user interface 240 both illustrated in FIG. 3. Further, the logged information may be displayed or stored on the client 100, the intermediate network device or the server 300. An adequate application which may also comprise a user interface may manage the displaying and/or storing of the logged information.

In an operation S210, the processed synchronization message may be forwarded to the client 100. The synchronization message is addressed to the client 100. The synchronization message may be transmitted via the communication connection 20 illustrated in FIG. 3 and via the communication connection 50 illustrated in FIG. 2, respectively.

In an operation S211, the client 100 receives the synchronization message from the intermediate network device 200. A client synchronization agent, e.g. the client synchronization agent 120 illustrated in FIG. 3, may interpret/parse and process the synchronization message in accordance with the contained synchronization information and advantageously in accordance with the synchronization markup language (SyncML) standard.

The above described operations S200 to S211 describe the interacting of the client 100, the intermediate device 200 and the server 300 in accordance with the concept of the present invention. The mentioned description illustrates the communication of two synchronization messages, a client generated synchronization message and a server generated synchronization message. It should be understood that the present invention is not limited to the communication of two synchronization messages, since the complete synchronization session may comprise a plurality of synchronization messages which may be communicated in the described manner.

The following operations relate to the initiation of a synchronization between the client 100 and the server 300 router through the intermediate network device 200. Two different initiating operations will be described, a router initiated synchronization and a client initiated synchronization.

Router Initiated Synchronization

In an operation S180, the intermediate network device 200 initiates a synchronization session. Therefore, the intermediate network device 200 transmits an initial synchronization message to the client 100 containing instructions in order to direct the client to establish a synchronization connection to the synchronization server, e.g. server 300.

Preferably, the initial synchronization message contains an alert instruction or code in order to initiate a synchronization session, respectively. Alert codes are defined in the synchronization markup language (SyncML) standard for initiating synchronization sessions. The alert codes are defined for different types of synchronization: two-way sync, one-way sync from client only, refresh sync from client only, one-way sync from server only, refresh sync from server only and server alerted sync. As regards a more detailed description of the initialization of synchronization session and data synchronization, reference is made, e.g., to the standard *SyncML Sync Protocol, version* 1.1, February 2002, which defines the synchronization markup language (SyncML) protocol, without restricting to this specific implementation of synchronization.

The intermediate network device 200 simulates a server alerted synchronization in order to initiate the synchronization by transmitting such an initial synchronization alert message to the client 100. The server alerted synchronization is a synchronization type in which the server alerts the client to perform synchronization. That is, the server informs the client to start a specific type of synchronization with the server. The initial synchronization alert message contains response address information addressing the intermediate network device in order to instruct the client to direct a following synchronization message thereto. In accordance with the above described operations, the intermediate network device 200 forwards the synchronization message to the server 300.

Commonly, an initial synchronization alert message additionally causes the client 100 to include status information into the succeeding synchronization message. The additional status information is not expected by the receiving server 300. The inclusion of the status information can be prevented by including instructions into the initial synchronization alert message of the intermediate network device 200, instructing the client 100 not to include status information. Such instructions can be coded by including a "no response" (NoResp) code. Alternatively, information which is not expected by the receiving device, the server 300 or the client 100, can be removed from the synchronization message. Such a removing operation is part of the processing of the synchronization message which is described in the operations S202 and S209 with reference to FIG. 4.

The synchronization messages of a synchronization session which may be initiated by an initial synchronization alert message may each contain an identification number, which is increased with each subsequently exchanged synchronization message indicating the sequence thereof. In case of a simulated server alerted synchronization by the intermediate network device 200, it may be necessary to adapt the numbering of the synchronization messages due to the reason that the server is not informed of the initialization of the synchronization. The intermediate network device 200 may renumber the identification number in order to present to expected identification number to the server 300 and the client 100, respectively. The identification number may be processed in the operations S202 and S209, respectively, described with reference to FIG. 4.

The initial synchronization alert message of the intermediate network device contains an identification number (MsgID) which is one less than the identification number sent in the first synchronization message by the server (Initialization message from the server). Since the identification number is increased by one with each synchronization message of a synchronization session the subsequent synchronization message which is forwarded to the server 300 contains the identification number (MsgID) which is expected by the server 300 and the numbering does not have not to be adapted by the intermediate network device during the forwarding of the synchronization messages to the server 300 or the client 100, respectively. Another alternative is that the intermediate network device modifies the message identification numbers (MsgID) sent by the server throughout the session.

It should be noted that it may also be possible to introduce a new alert coding to the initial synchronization alert message indicating to the receiving client 100 that this initial synchronization alert message is transmitted from the intermediate network device 200. The succeeding synchronization message of the synchronization session which is initiated by this initial synchronization alert message may be adapted accordingly, i.e. may not comprise status information which may not be expected by the server 300 and may have an identification numbering in accordance with the synchronization markup language (SyncML) standard.

Additionally, it should be noted that the initial synchronization alert message transmitted by the intermediate network device 200 may contain information in accordance with the connection type. This information may contain information about the connection medium, the data rate provided by the connection, the protocol used by the connection and the like. This information may be used for initializing a further synchronization session taking advantage of the communication connection to the intermediate network device 200. Additionally, this information may be used for initializing further data exchange processes using the communication connection via the intermediate network device 200. According to the synchronization markup language (SyncML) standard it is currently not known to include information about the communication connection into an initial synchronization alert message such that information about the connection are provided to the client 100.

In an operation S190, a synchronization message in accordance with the above described consideration may be generated for transmitting to the intermediate network device 200.

Client Initiated Synchronization

In an operation S170, the client 100 is informed of the presence of the communication connection (connection 50 shown in FIG. 1 or connections 20 and 21 shown in FIG. 3) to the intermediate network device 200. The presence of such a communication connection allows the client 100 to initiate the establishment of the synchronization by itself. Advantageously, the client 100 can be instructed by a user input to establish the synchronization session routed via the intermediate network device. A corresponding menu item for selection may be presented to the user by the client 100.

Correspondingly, the following synchronization message is adapted to the expectations of the receiving server 300. Particularly, in accordance with the aforementioned necessities of the synchronization message the synchronization message may not include any status information and the numbering may differ from the synchronization markup language (SyncML) standard.

In an operation S190, a synchronization message in accordance with the above described considerations is generated for transmitting to the intermediate network device 200.

Additionally, the client synchronization can also be triggered by the server. Therefore, the server sends a trigger message to the client. The client should in this case be adapted to detect or determine otherwise that there is a communication connection available between the client and the server via the intermediate network device and that this communication connection is advantageous to use. The detection or determination requires additional logic on the client side. The triggering of the synchronization process by the server and a subsequent initiation of the synchronization process is advantageous for a user since a synchronization process will include a large amount of data to be transferred and since the communication connection via the intermediate network device may offer a faster data communication and eventually additionally a cheaper one.

It will be obvious to a person skilled in the art that as the technology advances, the inventive concept can be implemented in a number of ways. The invention and its embodiments are thus not limited to the examples described above but may vary within the scope of the claims.

The invention claimed is:

1. A method, comprising:
   receiving data arranged for transmission from a first device at an intermediate network device, said received data comprising synchronization related information, said synchronization related information being part of an end-to-end synchronization session operated between said first device and a second device for synchronizing data stored at said first device and said second device,
at said intermediate network device, obtaining said synchronization related information from said received data;
at said intermediate network device, parsing said synchronization related information for routing related information, wherein said routing related information comprises response address information indicating to transmit a response to said first device as recipient thereof, wherein said routing related information further comprises recipient address information indicating said intermediate network device as recipient of said synchronization related information;
at said intermediate network device, processing said routing related information contained in said synchronization related information such that synchronization related information comprising processed routing related information is obtained;
at said intermediate network device, arranging processed data comprising said synchronization related information with said processed routing related information; and
transmitting said processed data from said intermediate network device to said second device,
wherein said processing of said routing related information comprises:
replacing said response address information indicating to transmit said response to said first device as recipient with response address information indicating to transmit said response to an intermediate network device as recipient of said synchronization related information, and
replacing said recipient address information indicating said intermediate network device as recipient of said synchronization related information with recipient address information indicating said second device as an originally dedicated recipient of said synchronization related information so that the second device does not receive routing related information containing recipient address information indicating the intermediate network device as the recipient thereof.

2. Method according to claim 1, wherein said arranging comprises formatting the data, adding header information for transport level routing and forming at least one data packet of the formatted data and header information.

3. Method according to claim 1, wherein said method is initialized by instructing one of said first device and said second device to establish said connection for synchronizing data between each other routed through said intermediate network device.

4. Method according to claim 3, wherein an initial data packet is transmitted from said intermediate network device to one of said first device and said second device, said initial data packet comprising instructions for initializing.

5. Method according to claim 1, wherein said parsing of said synchronization related information for said routing related information comprises:
caching address information of said first device contained in said synchronization related information.

6. Method according to claim 1, wherein said parsing of said synchronization related information for said routing related information comprises:
logging status information in accordance with said synchronization related information.

7. Method according to claim 6, wherein said logging of said status information comprises:
transmitting said logged status information to said intermediate network device.

8. Method according to claim 1, wherein said processing of said routing related information comprises:
processing address information of said second device by modifying said address information in accordance with cached address information.

9. Method according to claim 1, wherein said processing of said routing related information comprises:
processing an identification number.

10. Method according to claim 1, wherein said processing of said routing related information comprises:
removing a part of said synchronization related information.

11. Method according to claim 1, wherein said connection is a logical connection in accordance with a hypertext transfer protocol.

12. Method according to claim 1, wherein said synchronization is based on a synchronization protocol according to a synchronization markup language standard.

13. Computer readable medium having computer-executable program code sections stored thereon for carrying out the method of claim 1, when said program code sections are run on a computer, a user terminal or network device.

14. Apparatus, comprising:
a communication interface and a routing agent,
wherein said communication interface is adapted for receiving data arranged for transmission from a first device and said communication interface is adapted for transmitting processed data arranged for transmission to a second device,
wherein said received data comprises synchronization related information, said synchronization related information being part of an end-to-end synchronization session operated between said first device and said second device for synchronization of data stored at said first device and said second device,
wherein said routing agent is adapted for obtaining said synchronization related information from said received data,
wherein said routing agent is further adapted for parsing said synchronization related information for routing related information, wherein said routing related information comprises address information indicating to transmit a response to said first device as recipient thereof, wherein said routing related information further comprises recipient address information indicating said apparatus as recipient of said synchronization related information,
wherein said routing agent is further adapted for processing said routing related information comprised in said synchronization related information,
wherein said routing agent is further adapted for obtaining synchronization related information comprising processed routing related information is obtained, and
wherein said routing agent is further adapted for arranging said processed data for transmission comprising said synchronization related information with said processed routing related information;
wherein said routing agent is further adapted for replacing said response address information indicating to transmit said response to said first device as recipient with response address information indicating to transmit said response to said apparatus as recipient of said synchronization related information, wherein said routing agent is further adapted for replacing said recipient address information indicating said apparatus as receipient of said synchronization related information with recipient address information indicating said second device as an originally dedicated recipient of said synchronization related information to obtain said processed routing related information so that the second device does not receive routing related information containing recipient address information indicating the intermediate network device as the recipient thereof.

15. System for synchronization data between a first device and a second device routed through an intermediate network device, said first device and said second device adapted to perform said synchronization, wherein said intermediate network device comprises:
a communication interface and a routing agent,
wherein said communication interface is adapted for receiving data arranged for transmission from said first device and said communication interface is adapted for transmitting processed data arranged for transmission to said second device,
wherein said received data comprises synchronization related information, said synchronization related information being part of an end-to-end synchronization session operated between said first device and said second device for synchronization of data stored at said first device and said second device,
wherein said routing agent is adapted for obtaining said synchronization related information from said received data, said routing agent
wherein said routing agent is further adapted for parsing said synchronization related information for routing related information, wherein said routing related information comprises address information indicating to transmit a response to said first device as recipient thereof, wherein said routing related information further comprises recipient address information indicating said intermediate network device as recipient of said synchronization related information,
wherein said routing agent is further adapted for processing said routing related information comprised in said synchronization related information,
wherein said routing agent is further adapted for obtaining synchronization related information comprising processed routing related information,
wherein said routing agent is further adapted for arranging said processed data for transmission comprising said synchronization related information with said processed routing related information;
wherein said routing agent is further adapted for replacing said response address information indicating to transmit said response to said first device as recipient with response address information indicating to transmit said response to said intermediate network device as recipient of said synchronization related information,
wherein said routing agent is further adapted for replacing said recipient address information indicating said intermediate network device as recipient of said synchronization related information with recipient address information indicating said second device as an originally dedicated recipient of said synchronization related information to obtain said processed routing related information so that the second device does not receive routing related information containing recipient address information indicating the intermediate network device as the recipient thereof.

16. Apparatus, comprising:
means for receiving data arranged for transmission from a first device and for transmitting processed data arranged for transmission to a second device, said received data comprising synchronization related information, said synchronization related information being part of an end-to-end synchronization session operated between said first device and said second device for synchronizing data stored at said first device and said second device;
means for obtaining said synchronization related information from said received data, and for parsing said synchronization related information for routing related information, wherein said routing related information comprises address information indicating to transmit a response to said first device as recipient thereof, wherein said routing related information comprises recipient address information indicating said apparatus as recipient of said synchronization related information,
wherein said means for obtaining are for processing said routing related information comprised in said synchronization related information and obtaining synchronization related information comprising processed routing related information, and for arranging said processed data for transmission comprising said synchronization related information with said processed routing related information;
wherein said means for obtaining are for replacing said response address information indicating to transmit said response to said first device as recipient with response address information indicating to transmit said response to said apparatus as recipient of said synchronization related information, and replacing said recipient address information indicating said intermediate network device as recipient of said synchronization related information with recipient address information indicating said second device as an originally dedicated recipient of said synchronization related information to obtain said processed routing related information so that the second device does not receive routing related information containing recipient address information indicating the intermediate network device as the recipient thereof.

17. Method according to claim 1, wherein said processing of said routed related information further comprises:
modifying a data packet identification number.

18. Method according to claim 1, wherein replacing said recipient address information further comprises:
at said intermediate network device retrieving said recipient address information indicating said second device as said originally dedicated recipient of said synchronization related information, which recipient address information indicating said second device as said originally dedicated recipient has been cached during processing of data arranged for transmission from said second device to said first device.

* * * * *

UNITED STATES PATENT AND TRADEMARK OFFICE
CERTIFICATE OF CORRECTION

| | |
|---|---|
| PATENT NO. | : 7,590,629 B2 |
| APPLICATION NO. | : 10/410881 |
| DATED | : September 15, 2009 |
| INVENTOR(S) | : Sahinoja et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Signed and Sealed this

Twenty-first Day of September, 2010

David J. Kappos
*Director of the United States Patent and Trademark Office*